United States Patent [19]

Rappas et al.

[11] 4,038,070

[45] July 26, 1977

[54] LOW TEMPERATURE AND PRESSURE CONTINUOUS REDUCTION OF COPPER IN ACID SOLUTIONS

[75] Inventors: Alkis S. Rappas, Arlington; J. Paul Pemsler, Lexington, both of Mass.

[73] Assignee: Kennecott Copper Corporation, New York, N.Y.

[21] Appl. No.: 695,390

[22] Filed: June 14, 1976

[51] Int. Cl.$^2$ .................................. C22B 15/12
[52] U.S. Cl. ................................ 75/108; 75/.5 A; 75/117; 204/106; 204/108; 423/42
[58] Field of Search ............ 75/108, 117, .5 A; 204/106, 108

[56] References Cited

U.S. PATENT DOCUMENTS

| | | | |
|---|---|---|---|
| 2,440,612 | 4/1948 | Lichtenwalter | 75/117 |
| 3,844,763 | 10/1974 | Burkin | 75/.5 A |
| 3,865,580 | 2/1975 | Hummel | 423/32 |
| 3,865,744 | 2/1975 | Parker et al. | 252/188.3 R |
| 3,883,351 | 9/1974 | Neskorg et al. | 75/.5 A |
| 3,937,657 | 2/1976 | Parker et al. | 204/108 |
| 3,961,028 | 6/1976 | Parker et al. | 204/106 |
| 3,966,890 | 6/1976 | Parker et al. | 204/106 X |
| 3,983,017 | 9/1976 | Szabo | 204/106 |

Primary Examiner—G. Ozaki
Attorney, Agent, or Firm—John L. Sniado; Anthony M. Lorusso

[57] ABSTRACT

Copper values are recovered from an acidic solution of solubilized cupric ions by the reduction of cupric copper to cuprous copper with hydrogen gas in the presence of a solid hydrogenation catalyst and in the presence of a cuprous ion stabilizing ligand. Catalyst poisoning by precipitation of copper metal on the surface of the catalyst during the reduction is avoided by controlling the ratio of Cu$^+$/ligand/Cu$^{++}$ and by terminating the hydrogenation before copper metal precipitates on the catalyst. The solution containing the cuprous ions is separated from the solid catalyst and the cuprous ions are then disproportionated to produce copper metal and cupric ions.

The removal of the last amounts of cupric ions from solutions, after several stages of reduction and disproportionation is achieved by allowing the cupric ions to precipitate on the catalyst as copper metal. The catalyst is then separated from the copper barren raffinate and regenerated by exposing it to a fresh pregnant cupric ion solution in the presence of a cuprous ion stabilizing ligand.

65 Claims, 11 Drawing Figures

I pH ~ 1.0
II pH ~ 3.98
III pH ~ 0.2
TO ~ 72°C
Vol ≃ 300 ml
S ≃ 0.617 g CATALYST
5% Pd ON $Al_2O_3$

LOW TEMPERATURE AND PRESSURE CONTINUOUS REDUCTION OF COPPER IN ACID SOLUTIONS

BACKGROUND OF THE INVENTION

This invention relates to the selective recovery of copper from various acidic solutions which may also contain nickel, cobalt, iron, and other ions. More specifically, it relates to a continuous process for recovering copper from acidic leaching liquors containing cupric ions in admixture with other metal ions and to a process useful as a recycle step for the process disclosed in U.S. Application Ser. No. 695,389 by A. S. Rappas, et al, filed on even date herewith, entitled Separation and Recovery of Copper Metal from Ammoniacal Solutions, the teachings of which are incorporated herein by reference.

In it known that copper metal can be precipitated from solutions containing complexed cuprous ions by disproportionation of the complex according to the following reactions:

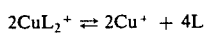

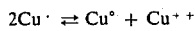

where L is a cuprous ion stabilizing ligand. U.S. Pat. No. 3,865,744 by A. J. Parker et al., broadly describes various methods of production and disproportionation of cuprous-nitrile complexes in acidic solutions. Among the methods included therein for the reduction of cupric ions to cuprous nitrile complexes are: reduction with $SO_2$ gas to Chevreul's salts and dissolution of the latter in the presence of nitriles to give the cuprousnitrile nitrile complexes; dissolution of crude copper metal with cupric solutions containing nitrile; and reduction of cupric to cuprous complexes by various metallic reducing agents, e.g., Ag, Fe, Ni, Zn, Cd, Co, Sn, etc.

Among the methods which achieve reduction of cupric ions to metallic copper (powders), it appears that the most attractive for industrial applications would be the $SO_2$ reduction process. However, the use of $SO_2$ as a reducing agent requires relatively high temperature and pressure, is very pH sensitive, is relatively slow, and is characterized by copper yields between 50 and 75% and low copper product purity necessitating further processing.

U.S. Pat. No. 870,786, to Jamau, broadly describes the reduction of cupric sulfate solutions to copper metal, whereas U.S. Pat. No. 1,201,899 to Weidlein teaches carrying out this reduction at specific temperatures and pressures, e.g., at 150° C and 100 psi. However, experience shows that recovery of copper by these methods rarely exceeds 50% by weight of the copper in solution. U.S. Pat. No. 3,880,647, to N. R. Tipman, discloses the use of certain catalysts such as dimethyl sulphoxide or dimethyl formamide for increasing the recovery of copper from solutions when the reduction is done with $SO_2$.

It would be very advantageous if such a reduction of cupric ions in solution could be performed with hydrogen gas since this reducing agent is relatively inexpensive, clean and results in acidified water as an effluent.

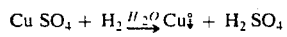

Thermodynamically, this reduction is possible. However, kinetically, it requires high pressures and temperatures as well as strict pH control, and thus the use of expensive equipment; and, the copper product is impure and requires further processing. U.S. Pat. Nos. 3,833,351 and 3,877,931, to D. R. Neskora et al. and D. R. Neskora, respectively, describe such a process for reduction of copper from solution using reducing gases, e.g., hydrogen, in continuous flow tubular reactors.

The instant invention arose from the realization that it would be highly advantageous if cupric solutions could be reduced with hydrogen gas in the presence of acetonitrile to produce a cuprous-nitrile complex which could subsequently be disproportionated in a separate reactor to yield very high purity copper metal. Manifestly, direct hydrogen reduction to produce cuprous-nitrile complexes under the conditions recited above is not feasible since, under the same conditions of temperature and pressure required, the nitriles are completely destroyed by hydrolysis according to the equation:

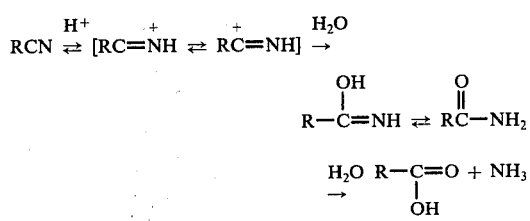

where R is an alkyl group, e.g., $-CH_3$.

SUMMARY OF THE INVENTION

In accordance with one aspect of the invention, it has been discovered that the reduction of cupric ions to cuprous ions in solution containing cuprous ion stabilizing ligands can be effected relatively rapidly by hydrogen gas under conditions such that these ligands are not destroyed. This reduction can be achieved at or close to ambient temperatures and atmospheric pressure with the aid of a hydrogenation catalyst such as palladium or platinum. Under the conditions to be described herein, poisoning of the catalyst by copper precipitation on its surface (as would normally be expected from such a process) is prevented.

Accordingly, the use of solid catalysts in the process of this invention makes it possible to employ hydrogen gas for the continuous reduction of cupric ions to cuprous ions in acidic solutions containing ligands, e.g., nitriles, without the need to carefully maintain the pH and without destroying the nitriles. The copper metal produced by this method, which is obtained by disproportionation of the cuprous complex rather than direct precipitation by hydrogen, has the characteristic very high purity of the disproportionated copper product. Thus, the process of this invention produces copper of high purity using only hydrogen as a reducing agent and thus ultimately produces only acidified water as an effluent.

According to another aspect of the invention, it has been discovered that acidic cupric solutions can be reduced in the presence of a cuprous stabilizing ligand in an electrolytic cell to produce a ligand stabilized cuprous solution suitable for use with the aforementioned disproportionation technique.

These latter two methods of reducing acidic cupric ion solutions to stabilized cuprous solutions may be advantageously employed as the recycle step for the process disclosed in U.S. application Ser. No. 695,389.

Thus, as will become apparent hereinafter, a preferred embodiment of the process of the invention produces copper metal from an ammoniacal solution containing cuprous ions. The process comprises the steps of precipitating the cuprous ions from the ammoniacal solution as a cuprous acetylide, separating and washing the cuprous acetylide precipitate, acid hydrolyzing the cuprous acetylide in the presence of a cuprous ion stabilizing ligand, e.g., a nitrile, and disproportionating the resulting cuprous complex to produce copper metal and cupric salt. The cupric salt, which is present in acid media as a result of the acid hydrolysis of the process, is then treated in accordance with the present invention whereby nitrile ligand stabilized cuprous ions are produced which may be recycled to, e.g., the acid hydrolyzing of acetylide step.

It is therefore an object of the invention to provide the means for achieving reduction of cupric ions to stabilized cuprous ions in acidic solutions containing cuprous ion stabilizing ligands, e.g., nitriles, by gaseous hydrogen under such conditions that neither the stabilizing ligands nor the hydrogenation catalyst used are destroyed.

Another object of the invention is to selectively separate copper from acidic solutions by first reducing cupric ions to cuprous ions by hydrogen reduction and subsequently disproportionating the cuprous ions to yield pure copper metal.

Still another object of this invention is to provide an economical method of reducing and recovering copper from acidic solutions in a continuous system wherein hydrogen gas is used as the reducing agent for a rapid copper reduction.

Another object of the invention is to provide such a reduction process which proceeds relatively rapidly even at low pH and thus does not require addition of base to maintain constant pH.

Another object of the invention is to provide a process wherein the purity of the copper metal product is superior to that of copper obtained by direct hydrogen reduction to copper metal.

Still another object of the invention is to provide a method of continuously reducing and recovering copper from acidic solutions wherein the reducing agent is hydrogen gas at atmospheric pressure and at or close to ambient temperature and wherein the recovery of copper is upward of 99% of the available copper in solution.

Another object of the invention is to provide a process for electrolytically reducing acidic cupric solutions to ligand stabilized cuprous solutions suitable for use in the known thermal disproportionation process.

Another object of the invention is to provide alternative recycle systems for the process disclosed in the aforementioned, co-pending U.S. Application to A. S. Rappas et al.

Another object of the invention is to provide a process for obtaining pure copper from ammoniacal copper containing solutions which avoids the necessity of electrowinning the copper, is capable of continuous operation on an industrial scale with a relatively low capital outlay, involves reactions which occur at or near ambient temperatures and pressures, and employs reagents which are neither unduly corrosive nor cunsumed.

Another object of the invention is to provide a copper recovery process which is energy efficient and which significantly diminishes the quantities of waste involved when compared with prior art processes by regenerating and recycling reagents.

Still another object of the invention is to quantitatively separate copper from ammoniacal solutions containing copper and other metals such as nickel, cobalt, iron, manganese, etc., without using an ion exchanger.

Another object of the invention is to produce copper of very high purity by precipitating cuprous ions from solutions as a cuprous acetylide, separating the cuprous acetylide precipitate, reacting the acetylide with an acid and a nitrile to form a cuprous-nitrile complex, disproportionating the cuprous ion to produce copper metal and cupric ions, reducing the cupric ions to ligand stabilized cuprous ions by either electrolytic or hydrogen reduction methods, and recycling the cuprous ions into the disproportionation cycle.

DESCRIPTION OF THE PREFERRED EMBODIMENT

At the outset, the invention is described in its broadest overall aspects with a more detailed description following.

Figure 1:
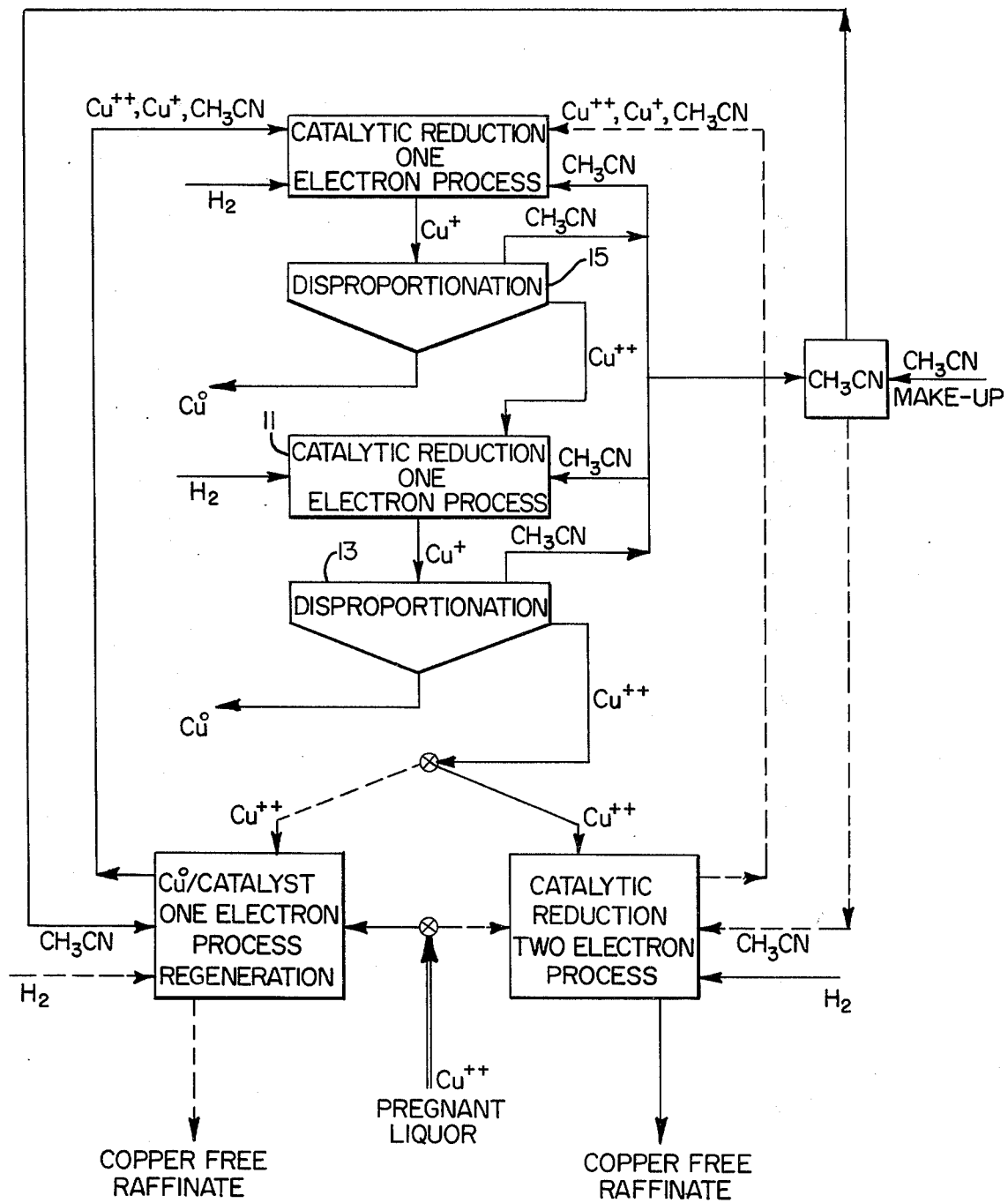
FIG. 1 is a schematic flow diagram illustrating one embodiment of the catalytic hydrogen reduction process as applied to an acidic liquor.

The present invention is a process for obtaining ligand stabilized cuprous solutions suitable for use in the known disproportionation process from acidic cupric solutions. In accordance with one preferred embodiment of this invention, as is shown in FIG. 1, acetonitrile is added together with an aqueous acidic solution, e.g., an acidic leach liquor, containing cupric ions in admixture with other metal ions, in a reactor. The amount of acetonitrile added to the solution depends on the concentration of copper in solution, a sufficient amount being present to stabilize the cuprous ions formed during the hydrogen reduction and thus to prevent copper metal precipitation either by disproportionation or by direct reduction of cupric ions. A solid hydrogenation catalyst such as palladium or platinum, preferably on an inert support such as alumina or carbon, is added to the above solution, and hydrogen gas is introduced into the reactor. Intimate contact between the reacting hydrogen gas, solution, the catalyst should be provided by, e.g., vigorous stirring.

This reduction of cupric to cuprous acetonitrile complex with hydrogen gas can be carried out in a stirred tank reactor with added powdered or immobilized catalyst, in a fluidized bed reactor, in a trickle bed reactor, etc. as may be required for a particular system use. The reduction can be carried out at temperatures ranging from ambient to about 65° C, at high pressures but preferrably at pressures only slightly higher than atmospheric to ensure a positive gas flow through the system, and even at very low pH. The reduction can proceed at concentrations of acid higher than 1M, but, in this circumstance, the rate of acetonitrile hydrolysis increases.

The solution containing cuprous acetonitrile complex produced in the process is separated from the catalyst and thereafter thermally disproportionated in stage 15 by known methods, e.g., by flash distillation to yield pure copper metal. Hydrogen gas may be present in the flash distillation, and the overhead vapors, acetonitrile and some water, may be condensed and recycled to the catalytic reduction reactor, the hydrogen gas-acetonitrile-water vapor mix being used directly in the reduction.

The copper powder separated from the distillation step is very pure and can be melted and cast as desired to give a more marketable product. The solution containing cupric ions produced as a result of the disproportionation 15 can be sent to a second catalytic reduction stage 11 and thereafter disproportionated in stage 13.

After a suitable number of stages, the solution from which most of the copper has been removed can be sent to another group of catalytic reactors or the remaining copper can otherwise be recovered by conventional methods. Preferably, hydrogen gas can precipitate the remaining copper in the absence of nitriles directly on a solid catalyst, similar to the one used above, and the copper free raffinate can be sent for further processing, e.g., removing some of the acid, recovering other ions in solution, or leaching copper bearing minerals. This catalyst "poisoned" with copper metal in the latter stage can be regenerated. The present invention provides a method of regenerating this catalyst by treatment with cupric solution containing acetonitrile in an inert atmosphere. Thus, the partially reduced cupric solution from the latter catalyst regeneration stage can be sent to the first catalytic reactor, where it is further reduced by hydrogen gas.

The reactions on which the method of this invention is based are as follows:

$$H_2(g) \xrightarrow{catalyst} 2H^+ + 2e^- \qquad 1.$$

$$2Cu^{++} + 2e^- \rightleftarrows 2Cu^+ \qquad 2.$$

$$Cu^{++} + 2e^- \rightleftarrows Cu^\circ \qquad 3.$$

$$Cu^+ + e^- \rightleftarrows Cu^\circ \qquad 3'.$$

$$2Cu^+ + 4\ ligand \rightleftarrows 2Cu(ligand)_2^+ \qquad 4.$$

$$2Cu(ligand)_2^+ \xrightarrow{heat} 2Cu^+ + 4\ ligand \qquad 5.$$

$$2Cu^+ \rightleftarrows Cu^\circ + Cu^{++} \qquad 6.$$

$$Cu^\circ/Pd + Cu^{++} + 4L \rightarrow 2CuL_2^+ + Pd \qquad 7.$$

It is known that reaction 1 proceeds with no difficulty even at low pH as evidenced, for example, by the conventional hydrogen-platinum electrode. If only a hydrogenation catalyst such as platinum or palladium is added to a cupric solution, and hydrogen gas is bubbled therethrough, the reduction will follow the course of reaction 1, 2, 3, 3' and 6. Copper metal will be deposited on the solid catalyst, thereby poisoning it and making further reduction by hydrogen gas impossible. Furthermore, the copper product cannot be easily separated from the expensive hydrogenation catalyst used. In accordance with the present invention, it has been discovered that pure copper with no catalyst inclusions can be obtained from cupric solutions by hydrogen reduction at or close to ambient T° and P using a solid catalyst provided the reduction is carried only to the cuprous ion stage, the cuprous ions are stabilized in solution by suitable ligands, e.g., nitriles, preferably acetonitrile, the cuprous solution and solid catalyst are separated, and thereafter the ligands are removed and the cuprous ion disproportionated (reactions 1, 2, 4, 5 and 6).

In order to achieve a separation between reduction and disproportionation stages, the cuprous ions formed must be stabilized by some ligand, as per reaction 4. In the preferred embodiments of this invention, nitriles, and more specifically acetonitrile, is the cuprous ion stabilizing agent. The reduction can be carried out in a stirred tank reactor in which powdered catalyst is added to the solution. It can also be performed in a continuous flow reactor, such as a trickle bed reactor, with an immobilized catalytic bed similar in construction to those used in hydrodesulfurization reactions. The main requirement in designing such a reactor is to provide intimate contact among the catalyst, hydrogen, and the ions of interest.

Extensive experimentation has been carried out to determine the dependence of the reduction on the main parameters affecting the desired reaction. The results of these experiments indicate that the procedure can provide a rapid, continuous process which is easy to monitor and maintain and which avoids catalyst poisoning. The following parameters were suspected of affecting the reduction process:

1. C, total cupric concentration, at time O, i.e., C = $[Cu^{++}]_8$;
2. S, weight of catalyst, for a given catalyst, (grams);
3. T, temperature, (°C);
4. H, the initial pH of the aqueous $Cu^{++}$ solution before the addition of $CH_3CN$;
5. X, $CH_3CN$ to $[Cu^{++}]_o$ mole ratio;
6. $P_{H_2}$, partial pressure of hydrogen, (atm.);
7. St, stirring characteristics (stirring speed, propeller type and positioning, baffles, total volume of solution, etc.).

Experiments were designed to determine the relative importance of the parameters in the above list. An exemplary procedure was as follows:

A measured volume of $CuSO_4$ stock solution of known concentration was introduced into a reaction flask and stirred until the operational temperature was reached. The pH of the solution was adjusted by addition of small amounts of acid, usually $H_2SO_4$. Argon at a low flow rate was continuously passed through the reaction flask to maintain an inert atmosphere. When $T_o$ was reached, a measured volume of acetonitrile was introduced into the flask and stirring was continued until $T_o$ was reached again. A weighed amount of a catalyst consisting of 5% Pd on alumina was then added and allowed to settle to the bottom of the flask. The argon flow was switched off, and hydrogen was introduced into the reaction at a low flow rate. The zero on the time scale was taken when $P_{H_2} = 1$ atm, and stirring was started.

At certain time intervals, 0.5 ml samples of solution were withdrawn with a gas tight syringe and titrated to determine cuprous concentration. After titration, each sample was analyzed to determine its total copper concentration. Plots were obtained for amount of reduction ($[Cu^+]/[Cu^{++}]_o \times 100\%$) vs. time for various sets of variables. At the end of each experiment, a 25 ml sample was taken from the reaction flask, filtered through a 0.1 micron filter, and analyzed by atomic absorption to determine any possible loss of palladium catalyst by solubilization. No loss was detected. A similar 25 ml sample was analyzed by gas chromatography to determine losses of acetonitrile by hydrolysis: typically, these losses were less than 0.05%.

Figure 2:
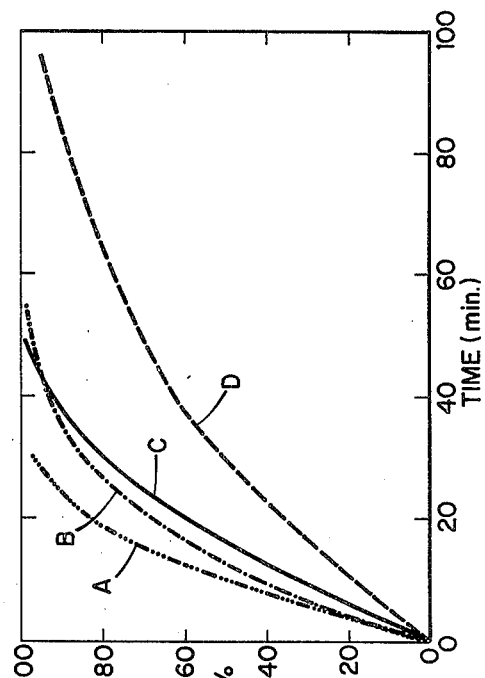
FIG. 2 is a graph of percent cuprous ion obtained from a cupric sulfate solution versus time which illustrates the effect of varying certain parameters in the catalyzed hydrogen reduction of cupric ion to cuprous acetonitrile complex in acid media.

Some results from these experiments are graphically illustrated in FIG. 2. The pH in all the experiments from which FIG. 2 was derived was adjusted to 1.0, 1 liter of solution was used, C at time 0 was approximately 43.05 grams per liter, and X was adjusted to equal 4. Curve A represents a reduction using 0.80 gram of palladium catalyst (S=0.80) while maintaining T at 65° C. Curve B represents a reduction utilizing the same amount of catalyst but with T reduced to 30° C. Curve C represents a reduction using 0.40 grams of palladium catalyst (S = 0.40) accomplished while maintaining T = 65° C. Curve D represents a reduction accomplished using 0.40 grams of palladium catalyst and a temperature of 30° C. The hydrogen pressure ($P_{H_2}$) in the reactor was approximately equal to atmospheric pressure.

An interesting result of these experiments was that the reduction was almost unaffected by variations in pH in the range studied, i.e., 0.8 to 3.5; it was also found that X, the $CH_3CN/[Cu^{++}]_o$ mole ratio, was an insignificant factor as long as it was greater than 2, i.e., as long as there was enough $CH_3CN$ present to stabilize the cuprous ions formed. The major factors influencing the reduction of $Cu^{++}$ to $Cu(CH_3CN)_2^+$ were found to be, in order of significance:
1. the catalyst activity (here the catalyst weight, S)
2. the initial $Cu^{++}$ concentration (C = $[Cu^{++}]_o$); and
3. the temperature, $T_o$.

Further, it was found that the reduction rate was very close to zero order in $[Cu^{++}]$. The weak dependency on temperature in the range studied (30° - 65° C) indicates that the process had a low activation energy and therefore that the reduction is not chemically controlled. Acetonitrile losses during the experiments were extremely low.

Figure 3:
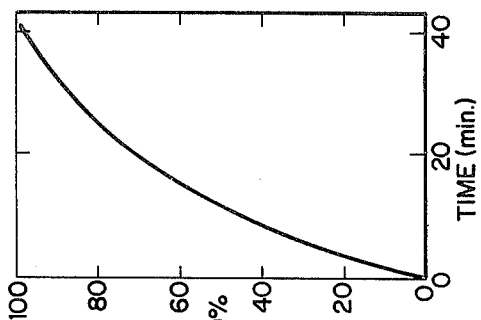
FIG. 3 is a graph similar to FIG. 2 disclosing the conditions of formation of the cuprous acetonitrile complex from the cupric salt.

The conditions for this reduction on a 1 liter solution containing 43.05 g of Cu, as $CuSO_4$, taking into account the economic factors, are as follows: H = 2.0, S = 0.6 g, T = 47.5° C, and X = 4. Under these conditions the 43.05 grams of $Cu^{++}$ undergo in excess of 95% reduction in about 40 minutes. The plot of percent reduction versus time under these conditions is shown in FIG. 3.

Figure 4:
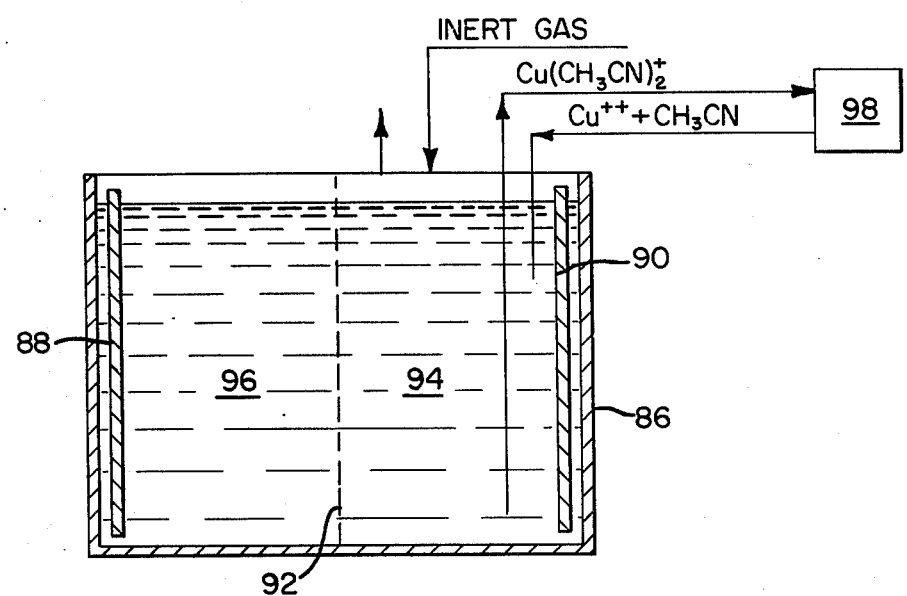
FIG. 4 is a schematic illustration showing a cross-section of an electrolytic cell of the type which is capable of reducing acidic cupric solutions to ligand stabilized cuprous solutions.

An alternative method of reducing cupric solutions to stabilized cuprous solutions involves the use of an electrolytic cell such as that depicted in FIG. 4. In this type of cell, a case 86 houses an inert anode 88 and an inert cathode 90. A semipermeable membrane or diaphragm 92 interposed between the anode and cathode defines, together with the case, a cathodic compartment 94 and an anodic compartment 96. The diaphragm prevents the cuprous ions formed in the cathodic compartment from reaching the anodic compartment where oxidation occurs. When the anodic compartment contains an acid, e.g., sulfuric acid, and when acidified cupric solution is added together with a stabilizing ligand to the cathodic compartment, a current can be passed through the cell which will produce ligand stabilized cuprous ions, e.g., the complex $Cu(CH_3CN)_2^+$.

At the anode, water is decomposed to release oxygen gas and to produce $H^+$ ions:

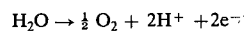

At the cathode, cupric ions are reduced to cuprous ions which are in turn stabilized as a cuprous complex:

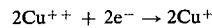

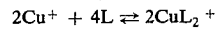

where L is a cuprous ion stabilizing ligand, e.g., a nitrile, preferably acetonitrile. The overall reaction is thus:

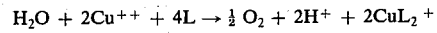

Circulating means 98 may be incorporated to circulate the fluid in the cathodic compartment. As will be obvious to those skilled in the art, oxidizing agents such as the oxygen gas produced at the anode should be kept out of the cathodic compartment. One method of ensuring that no oxidizing agents enter cathodic compartment 94 is to supply an inert gas atmosphere.

With respect to this embodiment of the invention, it is, of course, known that crude copper can be cast into anodes and electrorefined in a one electron process in the presence of nitriles to obtain pure copper cathodes. This electrochemical disproportionation is described in U.S. Pat. No. 3,865,744 and U.S. Pat. No. 3,937,657 issued to A. J. Parker et al. However, it is believed that cupric solutions have not previously been electrolytically reduced to produce cuprous-nitrile complexes which may thereafter be thermally disproportionated.

As indicated above, it has been discovered that this reduction can be achieved efficiently with inert electrodes only if the anodic and cathodic compartments are separated, e.g., by a semipermeable diaphragm. The anodic compartment of the electrolytic apparatus preferably contains either a sulfuric acid solution or acidified cupric sulfate solution. The potential of the cell and the concentration of the copper species in solution are interdependant and must be fixed in such a way that no copper metal precipitates on the cathode. Thus, the potential will vary with different $Cu^{++}$ concentrations. This adjustment will be well within the skill of those in the art in view of the instant disclosure.

Experiments using cells such as those disclosed in FIG. 4 were carried out as follows to demonstrate the feasibility of the electrolytic embodiment of the process of the invention. 100 ml of $CuSO_4$ solution containing 20 g/L $Cu^{++}$ and having a pH = 3.0 was added to the cathodic compartment. The cathode was made of a 10 × 10cm piece of stainless steel sheet; the anode of a 10 × 10cm piece of lead. The polyvinyl chloride, semipermeable diaphragm, of the type well known in the art, was used to separate the cathodic compartment from the anodic compartment. The solution in the cathodic compartment was circulated in and out of the compartment by means of a peristaltic pump at approximately 250 ml/min. 20 ml of acetonitrile was added to the solution in the cathodic compartment. An inert atmosphere (argon) was maintained over the cathodic compartment. The distance between the cathode and the diaphragm was 6 mm and that between the diaphragm and the lead anode was 3 mm. The electrolyte of the cathodic compartment was circulated in and out in order to provide some mixing in this very narrow compartment and thus avoid vertical concentration gradients or phase separation of a cupric/acetonitrile/water mixture, and also to increase the volume of the solution beyond the 60 cc capacity in the actual cathodic compartment so that samples could be withdrawn for cuprous analysis without significantly affecting the system. The same composition of $CuSO_4/H_2O/CH_3CN$ as in the cathodic solution, but at pH = 1.0, was circulated in the anodic compartment. A constant direct current power supply was used to pass 60.0 milliamperes through the solution.

At fixed intervals, 0.5 ml samples were withdrawn from the cathodic solution and analyzed for cuprous and total copper. The results were reported as cuprous/total copper in the sample × 100, i.e., $Cu^+/Cu_t \times 100 = \%$.

Typically, for the above electrolyte cell, it was found that 17-30% conversion to $Cu(CH_3CN)_2{}^+$ was routinely possible in 3.5-4 hours at currents between 50 and 100 mA.

Obviously, the above described cell is not as efficient as would be desirable in commercial production. However, those skilled in the art will have little difficulty improving it to give higher conversions to cuprous complex in a shorter period of time, and higher current efficiency.

The invention will now be disclosed in combination with a process wherein copper metal is recovered from an ammoniacal cuprous solution and wherein an acetylide intermediate is utilized as a ligand exchange medium. (exchange from ammoniacal to acid).

At the outset, it should be pointed out that this overall process may be modified to use either ammoniacal cupric or cuprous solutions as desired. One representative source of an ammoniacal leach liquor containing cuprous, as well as nickel, cobalt, and molybdenum values, is the pregnant liquor that is obtained from leaching manganese nodules. For details of such a leaching process, see U.S. Pat. No. 3,983,017 Lester J. Szabo, entitled Recovery of Metal Values from Manganese Deep Sea Nodules using Ammoniacal Cuprous Leach Solutions, filed Feb. 10, 1975, the teachings of which are incorporated herein by reference.

One reason why such leach liquor can be advantageously treated by the present process to recover copper values is that the copper values are present in a reduced cuprous state. However, the present process can be employed to great advantage when treating other ammoniacal leach liquors so long as the copper values are first reduced to the cuprous state. Thus, an ammoniacal leach liquor containing cupric copper and possibly other metal values is reduced with a reducing agent such as synthesis gas to produce the cuprous ammine complex in solution. Alternatively, an aqueous ammoniacal cupric solution may be reduced by intimately contacting an inert organic phase containing an organic reducing agent, of the type known to those skilled in the art, with the aqueous phase to produce the cuprous solution.

In practicing the overall process of the invention, the ammoniacal leach liquor containing cuprous ions is contacted with acetylide to precipitate the copper values as cuprous acetylide. The acetylide is then reacted with acetonitrile and an acid to form acetylene and a cuprous-acetonitrile complex, e.g., $Cu(CH_3CN)_2{}^+$. The cuprous-acetonitrile complex is then disproportionated into copper metal and cupric ions. Following this step, the copper metal is collected. The cupric ions form salts of the acid used during the hydrolysis of the cuprous acetylide. This acidified source of cupric ions, produced in equimolar proportions with metallic copper during disproportionation, is then reduced, using either the hydrogen-catalyst method or the electrolytic method disclosed herein, to a ligand stabilized cuprous state. This solution may then be reduced, recyled, or otherwise disproportionated as desired.

If the hydrogen process disclosed herein is used for the cupric reduction to cuprous complex, then the cuprous complex may be recycled to the acid hydrolysis of cuprous acetylide step since the cuprous solution will contain an excess of hydrogen ions necessary for the hydrolysis. These hydrogen ions will leave the acid cycle of the process as acetylene when this is regenerated from the acetylide, and thus the acidity of the system may be easily controlled at desirable levels.

The acetylene and acetonitrile may be contained in separate closed systems and recycled. Sulfuric acid may also be contained in a closed system and recycled if the last reduction is done with hydrogen gas and the nitrile complex produced is recyled to the dissolution of acetylide before distillation.

The acetylene is reclaimed during the formation of the cuprous complex in the acidic solution, and reused in the precipitation step. In like fashion, the ligand, e.g., nitrile, preferably acetonitrile, used in the formation of the cuprous complex to be disproportionated, is reclaimed during the disproportionation step and recyled. It is preferred to utilize sulfuric acid during the hydrolysis of cuprous acetonitrile. However, any organic or mineral acids, e.g., dilute $HNO_3$, may be used in this step so long as it does not interfere with the desired reaction.

Figure 9:
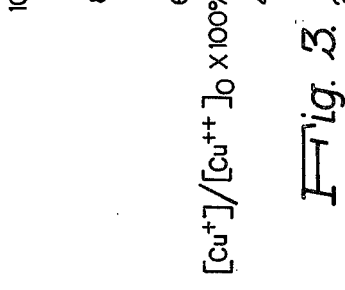
FIG. 9 is a schematic flow diagram illustrating one embodiment of the overall process of the invention as it is used in the recovery of metallic copper from an ammoniacal leach solution.

As is stated above, processes exist that produce cuprous ions. On the other hand, it may be necessary to produce cuprous ions by reducing cupric ions. Referring to FIG. 9, if synthesis gas is used for the above reduction to cuprous ammonia complex, the off gas will be hydrogen rich and may be recovered for use in the recycle of cupric sulfate as is shown. If the cuprous ions are produced in reactor 10, the residence time in reactor 10 should be adjusted so that complete conversion to cuprous is effected. The reduction with carbon monoxide is pH sensitive, as is well known, and the reduction rate depends on the concentration of cuprous ion present in solution. This dependence indicates that the reaction must be initiated by formation of cuprous ions by some other means, e.g., by addition of some copper metal into the reactor before the reduction with CO commences. The pH range is between 9 and 12 in this case, and it can be controlled by adjusting the ratio of carbon dioxide to ammonia. The temperature should be maintained below 70° C to minimize ammonia losses. The reduction can be performed at a carbon monoxide pressure close to atmospheric pressure.

Acetylene, compounds which produce acetylene, or a compound having the formula RC ≡ CH where R is alkyl with 1-6 carbon atoms, e.g., 3,3-dimethyl-1-butyne, is then introduced into precipitation reactor 12 and intimately contacted with the solution containing cuprous ions to precipitate a cuprous acetylide according to reactions such as:

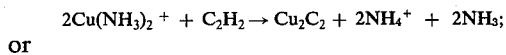

or

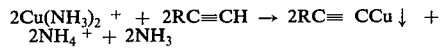

This precipitation is extremely rapid, quantitative, and specific for the removal of copper from the solution and is well known in the art. If silver or mercury ions are present in solution, they will coprecipitate with the copper. All other metal ions will remain in solution. The precipitation of cuprous acetylide occurs at ambient temperatures and pressures and the precipitate is easily settled, filtered, and washed. Only a slight excess of the acetylene need be used to ensure a quantitative precipitation. Cuprous ammoniacal solutions are very good scrubbing solutions for the removal of acetylenic compounds from gases, thus the acetylenic compound content in the gas introduced into precipitation reactor 12 can be anywhere from a few tenths of one percent to one hundred percent, the balance being hydrocarbons, nitrogen, helium, argon, hydrogen, carbon monoxide, etc. Gases which oxidize cuprous, such as oxygen, should not be allowed in reactor 12. The time required for complete cuprous acetylide precipitation is thus determined by the amount of copper in solution, concentration of acetylene in the feed gas, flow rate of feed gas, and degree of contact between the gas and liquid phases. Typically, a solution residence time of ten to fifteen minutes is sufficient.

The slurried precipitate from the precipitation reactor 12 is transferred to filtration and washing apparatus 14 where the cuprous acetylide is filtered, washed, repulped, and refiltered. Prior to filtration, the acetylide may be settled, the bulk of the solution decanted, and the thickened slurry thereafter filtered and washed as outlined above. Copper-free filtrates from filtration and washing apparatus 14 contain nickel, cobalt, and other metals which were present in the original ammoniacal liquor, which metals may be recovered by techniques known to those skilled in the art. Ammonia, ammonium carbonates, and any other anions will also be present in the copper free raffinate and can be recovered by known techniques. The filtration and washing efficiency is important, not so much for copper product purity, but for minimizing or eliminating the need for a purge of the copper recovery circuit. If the reduction in reactor 10 and the precipitation in reactor 12 are properly performed to completion, then the amount of copper that is lost in the raffinate is on the order of a few parts per million.

The washed cuprous acetylide filter cake is then resuspended in water and dissolved in an acidic solution of a nitrile, preferably acetonitrile, in dissolution tank 16. As has been stated above, a preferred acid is sulfuric acid. The dissolution of cuprous acetylide is actually a hydrolytic dissolution. It proceeds according to the reaction.

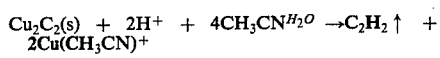

Acetylene is regenerated during this reaction and may be collected and recycled to the precipitation reactor 12. Up to 98% of the acetylene can be recovered from the cuprous acetylide for recycle and any loss can be made up be providing an acetylene makeup and introducing the gas into the recovery line as needed.

While the preferred ligand which stabilizes cuprous ions as a cuprous complex is acetonitrile, it will be obvious to those skilled in the art that other nitriles, e.g., an alkyl nitrile of the general formula RCN, where R is a lower alkyl group, may be substituted for the acetonitrile as desired. Non-limiting examples of such equivalent nitriles include acrylonitrile and 2 hydroxy-cyanoethane.

The rate of hydrolytic dissolution of acetylide depends on pH, concentration of acetonitrile in solution, and partial pressure of acetylene. Lower pH, higher concentration of nitrile, and removal of acetylene from the reactor favor the dissolution rate. The dissolution may be carried out at atmospheric or lower than atmospheric total pressure, and at temperatures ranging from ambient to 70° C. If the dissolution is performed at atmospheric pressure, the preferred temperature is 55° C. Typical residence time in the dissolution tank 16 is 15 to 30 minutes.

The dissolution should be carried out in the absence of oxidizing gases such as oxygen. One area of concern is the possibility of carry-over of the typically volatile nitrile from dissolution tank 16 into the precipitation circuit along with the acetylene. To prevent this, an off-gas condenser or a scrubber may be provided as necessary.

In the next step of the process, the cuprous acetonitrile complex containing solution is transferred to a disproportionation tank 18. The solution in tank 18 is indirectly heated with, e.g., exhausted steam, and flashed in a single stage to remove acetonitrile and thus to disproportionate cuprous ions into copper powder and cupric ions according to the reactions;

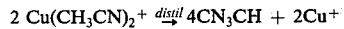

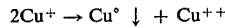

Acetonitrile and water form an azeotrope, 83.7:16.3, which boils at 76.5° C at atmospheric pressure. Acetonitrile can be distilled even from dilute solutions. Thus, the overhead vapors from the flash distillation step which contain water and acetonitrile may be fractioned to remove the water, thereby maintaining water-mass balance. The acetonitrile is recycled to the acetylide dissolution tank 16.

Conventional technology of dewatering, drying, briquetting, melting, and casting is used to turn the copper powder produced by the disproportionation into a more marketable form.

If sulfuric acid is used in the dissolution step, the cupric ions formed in the disproportionation will be in the form of cupric sulfate. For every mole of copper metal produced during disproportionation, one mole of cupric ions are also produced, and obviously, this oxidized copper must be recovered in order for the process to have any commercial significance.

Therefore, according to an important aspect of the invention, the cupric ions are recycled either to the acetylide dissolution tank or to the disproportionation apparatus. In order to achieve this recycle, $Cu^{++}$ must first be reduced to $Cu(CH_3CN)_2^+$. However, direct $H_2$ reduction of cupric ions to the cuprous acetonitrile complex is not feasible since the reaction requires strict control of pH and a high temperature and pressure, conditions which destroy the nitrile by hydrolysis as hereinbefore pointed out.

However, as set forth above, it has been discovered that the reduction of cupric ion to the cuprous acetonitrile complex can be accomplished at ambient temperatures and pressures with the aid of a hydrogenation catalyst such as palladium or platinum. If sufficeint acetonitrile is present to complex the cuprous ions formed and thus to decrease cuprous ion activity in the solutions so that it cannot disproportionate to give copper, catalyst poisoning is prevented; and, the cuprous acetonitrile complex may be quantitatively produced and thereafter reintroduced into the copper recovery circuit. The production of the cuprous acetonitrile complex by this method is accompanied by the production of $H^+$ ions and therefore is particularly well adapted for use in this process (hydrolysis of $Cu_2C_2$ where $H^+$ is "neutralized").

Alternatively, by suitable modification, the electrolytic system disclosed above may be used to effect this reduction. However, for reasons which will become apparent hereinafter, the hydrogen reduction method is preferred.

The cupric ions produced in disproportionation tank 18 may be delivered to catalytic reactor 20, and mixed with hydrogen and acetonitrile. In this situation, the acid produced by the hydrogen reduction in reactor 20 can be totally used to dissolve acetylide and regenerate acetylene by being introduced into dissolution tank 16. The sulfate or other acid anions can thus be contained in a closed system: hydrogen ions leaving the system via the acetylene recycle and being introduced via cupric reduction. Thus a proton build-up in the acid circuit of the process is avoided.

The coupling of the disclosed acetylide dissolution with the catalytic hydrogen reduction described herein is mutually beneficial since no acid is actually being consumed in the process (sulfate being contained in a closed circuit) and since, the catalytic reduction can be contained in a closed system with no undesirable hydrogen ion buildup. Thus, a process is provided wherein copper is quantitatively separated from relatively dilute cupric ammoniacal solutions and thereafter recovered as a very pure, copper powder product.

Feasibility of the process of the invention may be demonstrated by a series of laboratory tests using exemplary procedures as disclosed below. The apparatus used in these tests is illustrated in FIGS. 10 and 11.

Figure 10:
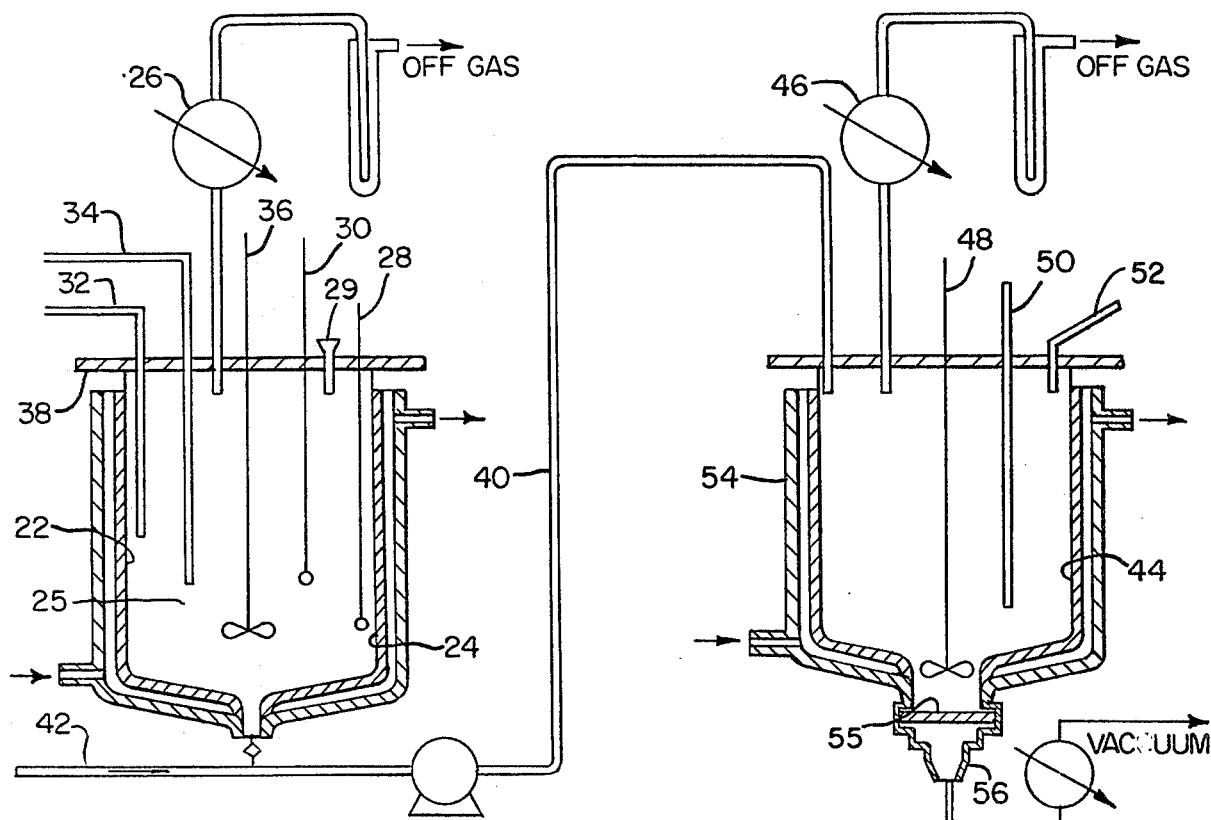
FIG. 10 is a schematic diagram of laboratory apparatus for effecting the reduction of cupric ammoniacal solutions to cuprous solutions and for precipitating and collecting cuprous acetylide; and, FIG. 11 is a schematic diagram of laboratory apparatus for effecting cuprous acetylide dissolution with means for collecting and disproportionating cuprous acetonitrile complex to form copper powder and cupric ions.

Referring to FIG. 10, a flask 22 is shown having a water jacket 24 through which water of a desired temperature may be circulated to control the interior temperature of the reaction chamber 25. The flask 22 is supplied with a water cooled reflux condenser 26, a pH detector 28, a thermometer 30, a sampling tube 29, a solution inlet 32, and a gas inlet 34. A stirrer 36 passes through the top 38 of container 22. At the bottom of the container, a conduit 40 equipped with an argon source 42, leads to flask 44. Like flask 22, flask 44 is equipped with a refluxing condenser 46, a stirrer 48, a thermometer 50, a gas inlet 52, and a water jacket 54 for temperature control. At the bottom of flask 44, a filter 55 separates the reaction chamber of the flask from an exit port 56 which leads through conduit 58 to a filtrate collecting chamber 60.

Figure 11:
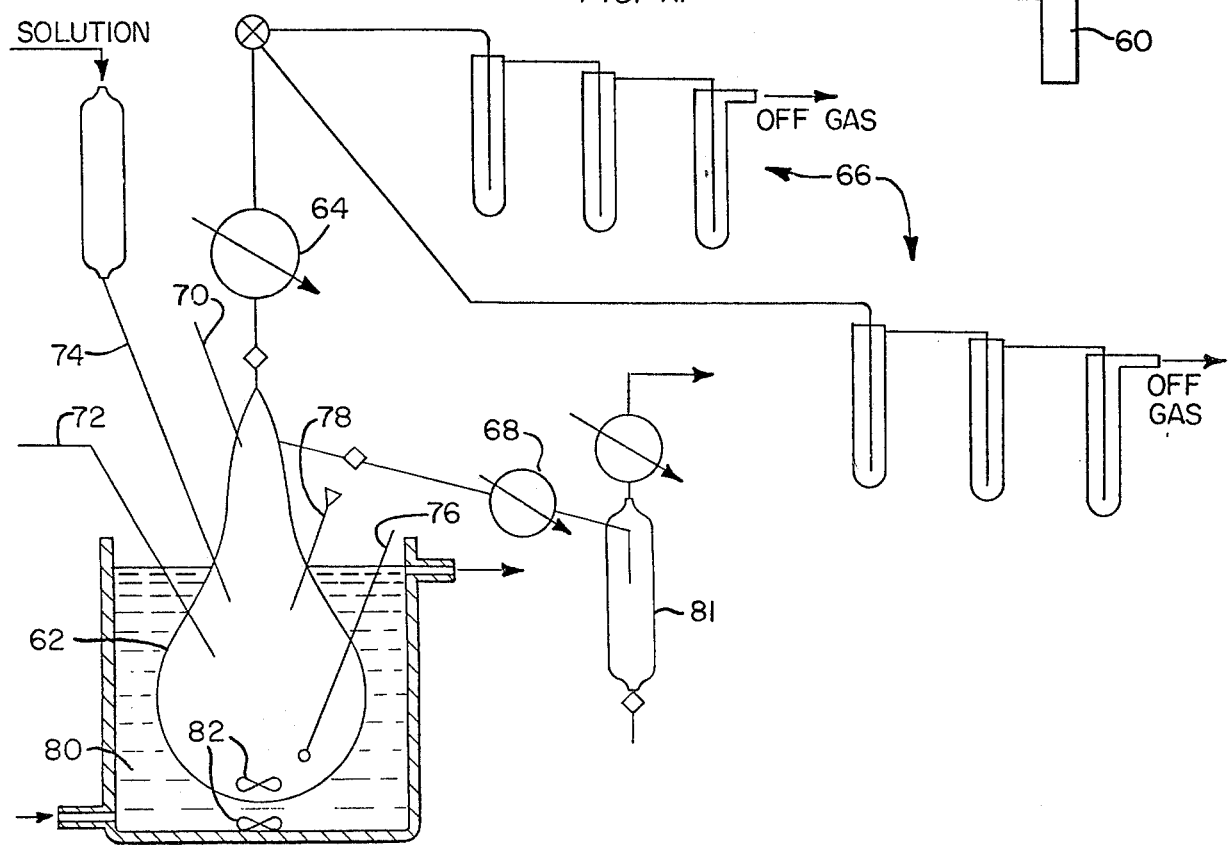

Referring to FIG. 11, apparatus for converting cuprous acetylide to the cuprous acetonitrile complex and for disproportionating the complex is shown. This apparatus comprises a four neck round bottom flask 62 equipped with a water cooled reflux condenser 64 which leads to a pair or alternately usable acetylene scrubbing systems 66. In addition to the four necks, the flask is equipped with a spiral condenser 68, usable alternatively with the refluxing condenser 64, collection flask 81, and a neck thermometer 70. The four necks of the flask are used as an argon inlet 72, a solution inlet 74, a reaction flask thermometer 76, and a sampling tube 78. The flask rests in a temperature controlled water bath 80 and contains a pair of magnetic stirrers 82.

EXAMPLE 1

Approximately 13.4 g of basic cupric carbonate (55.9% assay) and 10 g of ammonium carbonate are together dissolved in 300 ml of ammonium hydroxide (30% $NH_3$), and water is added to bring the total volume to 1 liter. The dark blue ammoniacal solution is introduced through solution inlet 32 into flask 22 for reduction with carbon monoxide. The temperature within flask 22 is kept constant at 45° ±2° C, and the pH of the solution is adjusted to 10.5 by controlling the relative amounts of ammonia and/or carbon dioxide introduced through gas inlet 34. The air initially in the flask is displaced with carbon monoxide, introduced through port 34, and the off-gases are passed through a gas flow indicator (not shown). Stirring commences when the air is completely displaced from the flask. A piece of copper wire, which has previously been cleaned by dipping in nitric acid solution, is introduced into the flask to initiate the reduction of cupric to cuprous. With a small positive flow of carbon monoxide maintained through the flask, the progress of the reduction is monitored by withdrawing samples of solution through sampling port 29 with a gas tight syringe.

The test samples removed are assayed for cuprous ion by being subjected to oxidation with a ferric solution, and thereafter titrating the resulting ferrous ions produced against a standard cerric solution.

When the reduction is complete, 600 ml of the colorless cuprous solution (containing 4.7416 g of copper) is transferred to flask 44 through conduit 40, while maintaining a low argon flow rate through argon supply 42 to prevent oxidation. Prior to introducing the cuprous solution into flask 44, the air therein is displaced with carbon monoxide, introduced through gas inlet 52, and the solution is stirred moderately. The reaction between the cuprous ions and acetylene is almost instantaneous at the temperature employed, i.e., 25° to 30° C.

In a few minutes, precipitation of cuprous acetylide is complete employing only a small positive flow of acetylene gas and moderate stirring. The slurry is then filtered through filter 55 under an argon atmosphere, the filtrate being collected in collecting chamber 60 and analyzed by atomic absorption to determine the amount of copper left in the solution. The filter cake which collects on filter 55 is washed with 200 ml of a dilute ammonia solution (pH 9.0 - 9.5) and the wash solution is analyzed by atomic absorption to determine percent copper in the wash solution. The amount of solid in the filter cake is determined by dissolving a weighed amount of the wet acetylide and analyzing the solution for copper. The amount of solid is calculated assuming that all copper in the solid is present as $Cu_2C_2$.

28.80 g of the filter cake obtained as disclosed above is then transferred into the four necked, round bottom flask 62. The handling of the wet cuprous acetylide is conducted such that contact with air is avoided or minimized in order to prevent oxidation. A solution comprising 44.8 ml $H_2O$, 6 ml $H_2SO_4$ (96.4%), and 23.0 ml $CH_3CN$, at approximately 40° C, is added to the wet acetylide in flask 62 through solution inlet port 74. Prior to this step, argon is introduced through gas inlet port 72 at a low flow rate to remove all oxygen. The acetylide dissolves completely within 25 minutes at 40° ± 2° C to give a light, yellowish clear solution. The acetylene produced from the dissolution of the acetylide in flask 62 is carried from the flask in the argon stream through refluxing condenser 64 and may be scrubbed as desired in either of the two acetylene scrubbing systems 66.

When the dissolution is complete, the outflow of gas is switched from the refluxing condenser 64 to the spiral condenser 68. The temperature in the water bath is increased in order to distil off the acetonitrile from the cuprous solution, and the cuprous ions are thus disproportionated into copper metal and cupric ions.

An azeotrope, $CH_3CN:H_2O = B$ 83.7:16.3, boils at 76.5° C. The heating of flask 62 continues until the temperature reaches 89° C at which point the condensate is collected (32 ml). The solution remaining in flask 62 (66 ml) contains 2.051 g of $Cu^{++}$. The copper metal is collected by filtration, washed with water, acetone, and finally benzene, and thereafter dried under argon.

To determine the total amount of copper metal produced, the empty flask 62 is rinsed with water and then a solution of $HNO_3$ is used to dissolve any copper that adheres to the walls. The concentration of copper in this solution is determined by atomic absorption, and the total weight of copper is calculated by adding the weight of the copper in this solution to the copper powder collected. Total copper metal produced under the above conditions is 1.899 g.

EXAMPLE 2

A snythetic ammoniacal solution having a pH of 9.7 is prepared containing the following:
10.0 g/l Cu (as carbonate)
0.501 g/l Ni (as carbonate)
0.489 g/l Co (as carbonate)
0.508 g/l Zn (as nitrate)
0.490 g/l Cd (as nitrate)
2 ppm Pb (as chloride)
50 g/l $(NH_4)_2CO_3$
75 g/l $NH_4OH$ 800 ml of the above solution is reduced with carbon monoxide in flask 22 as described in Example 1 using, as an initiator, a 2.12 g piece of copper wire.

400 ml of this reduced solution, containing 4.21 g $Cu^+$ and 0.0013 g $Cu^{++}$, is transferred through conduit 40 to flask 44, and the cuprous ions are precipitated with acetylene gas as described above at 30° C. The acetylide slurry is filtered. The filtrate, having a volume of 374.3 ml, is collected and analyzed by atomic absorption to determine the concentrations of metals in solution. It contains:

0.0024 g Cu
0.1873 g Ni
0.1861 g Co
0.1899 g Zn
0.1830 g Cd
1 ppm Pb.

The cuprous acetylide precipitate is repulped with 100 ml $H_2O$ and refiltered under an argon atmosphere. 20.15 g of the filter cake is transferred into flask 62 and then a solution consisting of 31.5 ml $H_2O$, 16.5 ml $CH_3CN$, and 4.7 ml $H_2SO_4$ (96.4%) is added through solution inlet 74. The acetylide is completely dissolved within 20 minutes at 40° C. After the dissolution, the flask is switched from the reflux condenser mode to the spiral condenser mode, and the temperature within the flask is raised to distill off the acetonitrile and thus to precipitate copper metal. This distillation is terminated when the temperature reaches 90° C. 20 ml of $CH_3CN/H_2O$ is condensed and collected in the collection flask 81.

The amount of copper metal collected by filtration and from the walls of flask 62 is 1.3240 g. Analysis by mass spectroscopy shows the following level of contamination of the copper powder:
Ni: 0.1 ppm
Cd: < 1 ppm
Pb: 0.2 ppm
Co: 0.01 ppm
Zn: 0.1 ppm

EXAMPLE 3

Manganese deep sea nodules are reduced and the metal values in the nodules are leached with an aqueous ammoniacal leach solution according to the procedure disclosed in U.S. Pat. No. 3,983,017. After leaching of the nodules, the concentration of various metals in solution is adjusted to the following values:
6.5 g/l copper
7.2 g/l nickel
1.925 g/l cobalt
0.01 g/l maganese One liter of the above solution is introduced into flask 22, heated at 47° C and adjusted to a pH of 10.3 by introducing ammonia and/or carbon dioxide through gas inlet 34 as needed. A small amount of copper powder is introduced into flask 22 in order to initiate the reduction of cupric ions by carbon monoxide as well as to increase the final copper concentration in solution. The cuprous ion concentration reaches a value of about 8 g/l within 50 minutes.

Approximately 625 ml of the cuprous containing solution is then transferred through conduit 40 into flask 44 and the cuprous ion is precipitated as an acetylide as described in Example 1. After the acetylide cake is washed on the filter with 200 ml of water at pH 10 ($NH_4OH$ added), a 21.889 g portion of the filter cake is transferred into flask 62 where it is dissolved with 34 ml of $H_2O$, 17.5 ml $CH_3CN$, and 4.25 ml $H_2SO_4$ (95.4%). The acetylide is completely dissolved within 30 minutes. The temperature reaches 59° C. After switching to the coil condenser as described previously, the temperature in the flask is raised to 91° C to distill off the acetonitrile and precipitate copper metal. The copper metal, collected by filtration and determined as set forth in Example 1, has a mass of 1.4006 g. The filtrate contains 1.593 g $Cu^{++}$, 0.00013 g nickel, and 0.0009 g cobalt. Analysis by mass spectroscopy of the copper powder indicated a nickel content of 0.3 ppm, a cobalt content of 0.02 ppm, a maganese content of 0.2 ppm, and a molybdenum content of 0.6 ppm.

EXAMPLE 4

The following experiment may be performed to determine the recoverability of acetylene upon dissolution of cuprous acetylide with a solution containing acetonitrile and sulfuric acid.

Cuprous acetylide is precipitated from an ammoniacal cuprous solution as described above and the acetylide is collected by filtration and washed with water under an argon atmosphere. A sample of the acetylide filter cake containing approximately 1.5 g of copper is transferred to flask 62 as quickly as possible in order to avoid prolonged contact with air. Argon introduced through gas inlet port 72 maintains an inert atmosphere within flask 62. A solution consisting of 25 ml of water and 5 ml of acetonitrile is added to the acetylide through solution inlet port 74 and the temperature is maintained at 40° C. When thermal equilibrium is obtained, a mixture of 24 ml $H_2O$, 8 ml $H_2SO_4$, and 8 ml $CH_3CN$ at 40° C is added in order to dissolve the acetylide. Argon gas which acts as a carrier for the acetylene produced by the hydrolysis, passes through the reflux condenser 62 and then through the acetylene scrubbers. One scrubber system collects all acetylene evolved up to a temperature of 43° C. The other system recovers the last traces of acetylene evolved between 43° and 84° C. When the total collected acetylene is determined quantitatively, 96.44% of the total amount theoretically present is collected. The small loss is believed to be due to the formation of carbonaceous materials which result from decomposition, polymerization, etc.

EXAMPLE 5 (Process of Acidic Liquors)

Dissolve 165.15 g of $CuSO_4.5H_2O$ in 800 ml $H_2O$ and introduce solution in the catalytic reactor (FIG. 5), under an argon atmosphere. Heat to 47.5° ± 1.5° C. Adjust pH to approximately 2 with concentrated $H_2SO_4$. Bring total volume of solution to 850 ml. Make a final pH adjustment to pH = 2.0. Add 0.60 g of catalyst (5% Pd on $Al_2O_3$), and let it settle (no stirring). Introduce $H_2$ at low flow rate to displace the argon. Add 150 ml of acetonitrile. The solution contains 43.05 g of copper ions. Keep a low positive flow of hydrogen through the reactor. Commence stirring (time zero for reduction). Take periodic samples of solution and determine $Cu^+$. In 38 minutes stop stirring: 41.01 g $Cu^+$ /l, 2.04 g $Cu^{++}$/l ($[Cu^+]/Cu^{++}]_o \times 100 = 95.26\%$). Filter under inert atmosphere to separate catalyst from cuprous solution. Transfer 800 ml of filtered cuprous solution to the distillation flask. Distill to disproportionate the cuprous complex to a final temperature of 90° ± 1° C (condensate: 145 ml of acetonitrile and water).

Filter to separate copper powder from cupric solution. ($Cu° = 15.077$ g, $[Cu^{++}] = 28.49$ g/l).

Figure 5:
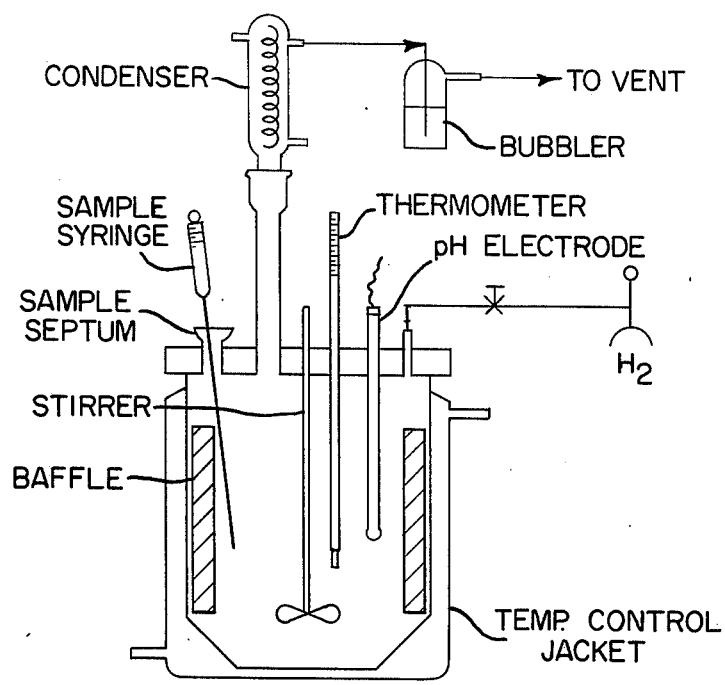
FIG. 5, is a schematic diagram of laboratory apparatus for effecting the catalytic reduction of cupric to cuprous acetonitrile complex by hydrogen gas. The same apparatus is used to effect the reduction of cupric ions onto the catalyst to obtain a copper free raffinate as well as to regenerate this catalyst.

Take 500 ml of this filtrate (28.49 g $Cu^{++}$/l) and transfer to the catalytic hydrogenation reactor (FIG. 5). Repeat above procedure for the reduction to cuprous acetonitrile complex. $T° = 47.5° \pm 1.5°$ C, S=0.5 g of previously used catalyst after washing and drying in argon; 50 ml acetonitrile added. The $[Cu^{++}]$ in the mixed solution is 25.9 g/l. In 13 minutes stop stirring: 25.00 g $Cu^+$/l. Filter to remove catalyst from solution. Distill to disproportionate the cuprous - acetonitrile solution. Final temperature 91° C, condensate 60 ml (acetonitrile and water). Filter to separate copper metal (6.48 g) from cupric solution (15.816 g $Cu^{++}$/l).

Figure 6:
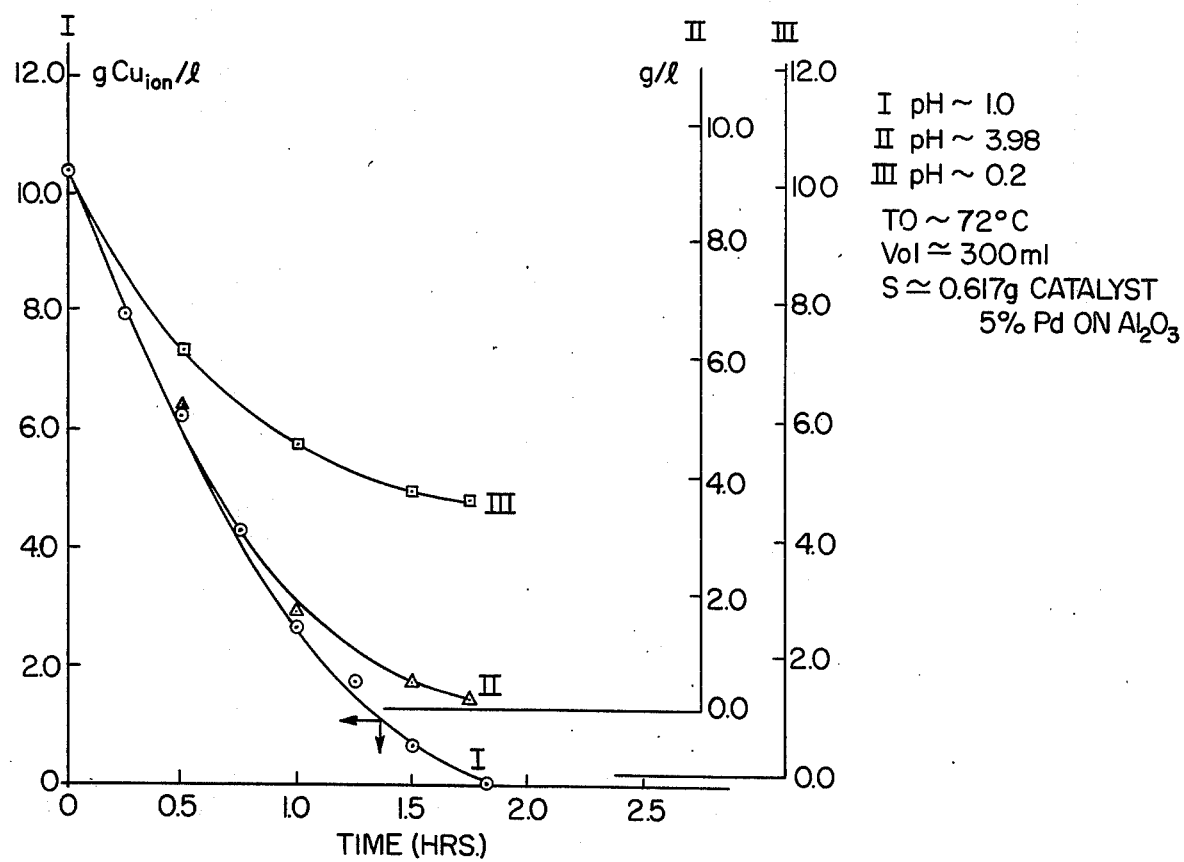
FIGS. 6–8 are graphs showing data pertaining to precipitation of copper on the catalyst.
Figure 7:
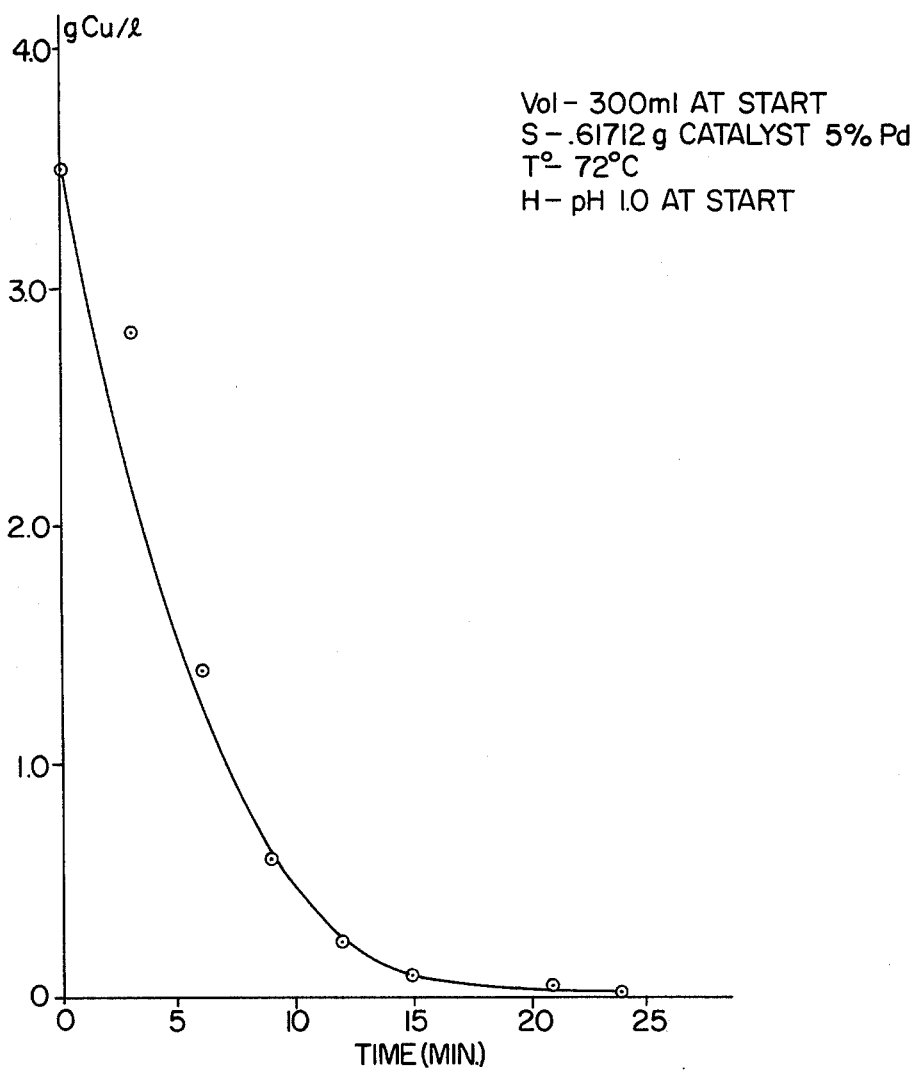
Figure 8:
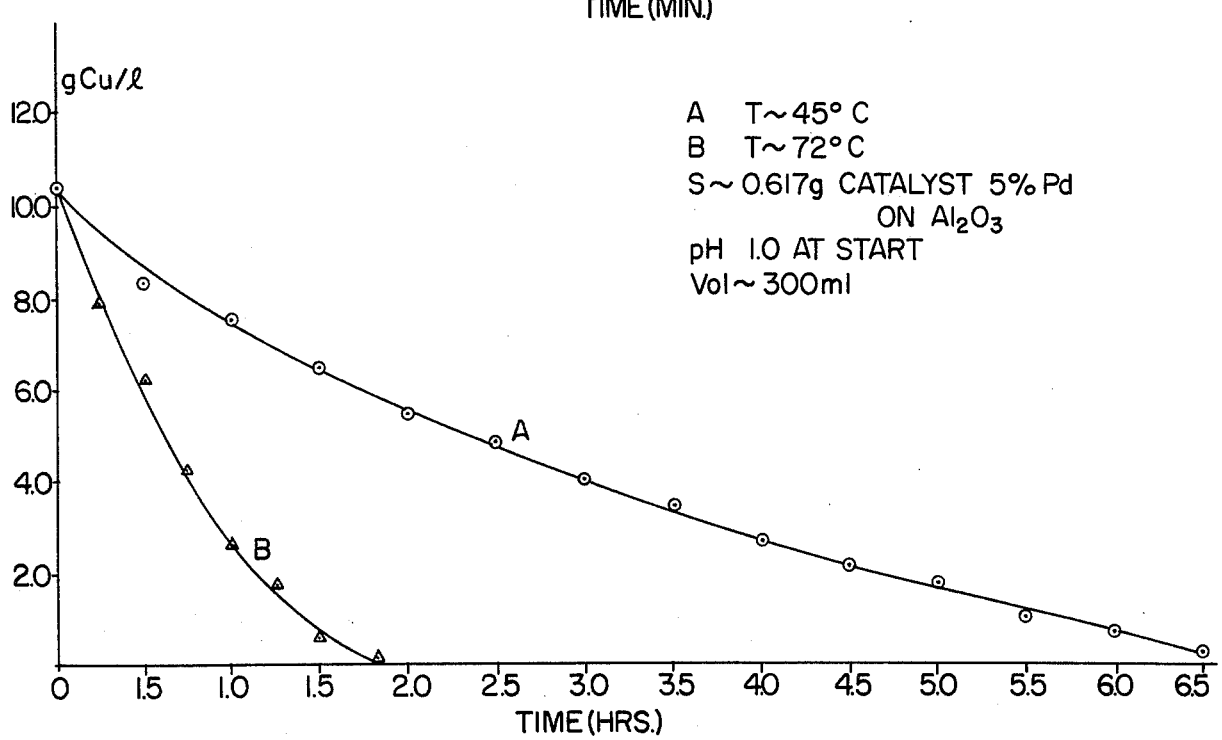

Take 300 ml of the above filtrate and introduce in the catalytic reduction reactor, (FIG. 5). Adjust pH to 1.0 with solution of NaOH or $H_2SO_4$ as needed. Raise the temperature to 72° ± 1° C and add 0.617 g catalyst Pd 5% on $Al_2O_3$. Introduce $H_2$ gas and start stirring as described before. Notice that no acetonitrile is added this time. Copper metal precipitates. Take periodic samples and determine total copper ions left in solution. Stop stirring after 150 minutes. Filter to separate Cu°/Pd catalyst. Determine copper ions in raffinate. Raffinate contains 15 ppm. Cu. FIGS. 6, 7 and 8 are graphs of such hydrogen reductions of cupric to copper metal on the catalyst with no $CH_3CN$ present.

The solid on the filter is a mixture of Cu° and Cu°/Pd. To regenerate the Pd catalyst, take the solids on the filter, introduce into a flask with fresh (initial) cupric sulfate solution add 10% acetonitrile and stir under inert atmosphere (argon) at 30° - 45° C until all copper dissolves. Filter under inert atmosphere. The solid on the filter (regenerated catalyst) is washed with acidified water ($H_2SO_4$, pH2) and then with water and dried in an argon atmosphere. The catalyst can be reused.

EXAMPLE 6 (Recycle Step)

Dissolve 31.45 g of $CuSO_4 . 5H_2O$ in 260 ml $H_2O$. Adjust pH to approximately 0.7 with $H_2SO_4$. Bring total volume of solution to 280 ml and make a final pH adjustment (pH = 0.7). Heat solution to 47.5 ± 1.5° C and add 40 ml acetonitrile. Add 0.4 g of catalyst (5% Pd on $Al_2O_3$) and follow the procedure of Example 5, to reduce cupric to cuprous acetonitrile complexes. Within 30 minutes the cuprous ion concentration is 23.99 $gCu^+$/l; total copper in solution is 7.9983 g. Filter, under inert atmosphere, to separate catalyst from solution. Transfer 200 ml of the cuprous solution to an addition flask 74, ((FIG. 11). Mix 26 ml of acetonitrile into solution in the addition flask.

Cuprous acetylide is precipitated, filtered, repulped, refiltered and thoroughly washed on the filter as described in Example 1. The amount of acetylide in the wet filter cake (16.29%) is determined as before. 16.17 g of the acetylide cake is introduced into flask 62, (FIG. 11) under inert atmosphere (argon). 113 ml of solution is transferred from flask 74 into flask 62 and the slurry is magnetically stirred. The dissolution of acetylide and scrubbing of acetylene evolved proceeds as described in Example 4. The temperature is maintained at 60° C. Samples are taken to determine the concentration of cuprous ions and total copper in solution. Within 25 minutes the concentration of cuprous ions is 37.208 g $Cu^+$/l and the total copper in solution is 38.016 g Cu/l. The acetylene produced during dissolution of acetylide is scrubbed and determined quantitatively. It is found that 369.6 ml (standard temperature and pressure) of acetylene are recovered.

The cuprous solution is then distilled to disproportionate the cuprous ions into metallic copper and cupric ions in solution. The copper powder is separated from the cupric solution. The amount of metallic copper and the cupric ions in solution are determined as described in Example 1.

The following quantities are obtained at the end of the distillation:
Copper powder — 2.2863 g Cu°
$CH_3CN/H_2O$ condensate — 33. ml
Cupric sulfate solution — 25.967 g Cu/l In the embodiment of FIG. 9, the only consumable reagents are carbon monoxide and hydrogen gas in approximately 2:1 molar ratio. Synthesis gas containing approximately 2:1 molar ratio of carbon monoxide and hydrogen can be obtained from coke and steam by partial oxidation of fuel oil and used in this embodiment of the present invention, as illustrated in FIG. 9. Acetylene, acetonitrile, sulfuric acid, and a solid hydrogenation catalyst are employed in a closed system, and hence are not consumed, although some makeup of inevitable small losses, when the process is practiced on an industrial scale, will be necessary. As can be appreciated from the above, the main form of energy consumed for the separation and reduction to copper metal is the thermal energy employed in disproportionation.

The copper metal obtained by employing this embodiment of the process of this invention is of very high purity since copper is doubly purified: first by being selectively separated as cuprous acetylide from basic solutions, and thereafter by being selectively recovered via disproportionation of $Cu^+$.

The acetylene/acetylide intermediate couple has multiple function and advantages insofar as it quantitatively and selectively separates copper from basic solutions as a solid compound, hence greatly concentrating the copper, as well as providing a first purification step. Its use enables the metal of interest to be transferred from a basic to an acid system without direct acid-base contact, thus avoiding neutralization and consequent reagent loss. This acetylide intermediate also makes it possible to exchange cuprous ion ligands from ammonia to acetonitrile. Direct exchange is both theoretically and practically impossible. Further, acetylene regeneration provides the means of preventing a hydrogen ion buildup in the acidic side of the process since it transfers protons from the acidic to the basic circuit of the process, and it introduces no impurities into the system and it is not consumed.

Incomplete washing of the cuprous acetylide which would result in carry over of ammonia, nickel, cobalt, carbonate, etc., the products of side reactions in the copper recovery circuit, impurities entering with the gases that react with the various solutions, and normal contamination of the process water are anticipated sources of contamination of the recovery circuit. Accordingly, a purge treatment is necessary. One skilled in the art will, of course, have no difficulty in designing such a purge system.

Although various embodiments of the invention have been disclosed, it should be noted that the broad concept of the invention pertains to a process for recovering copper values from an acidic solution of solubilized cupric ions. That process includes reacting the cupric ions with hydrogen in the presence of a solid hydrogenation catalyst and in the presence of a cuprous ion stabilizing ligand. Initially, the hydrogenation is terminated before copper metal precipitates on the solid catalyst. Because soluble cuprous ions are produced during hydrogenation, they can be easily separated from the solid catalyst as a cuprous ligand complex. The cuprous complex is then disproportionated to produce copper metal and cupric ions. The cupric ions thus produced are treated by repeating the process. Of course, each time the process is repeated, the amount of cupric ions present at the end of the disproportionation decreases.

Another important aspect of the invention is the removal of the last amount of cupric ions from the acidic solution, after several stages of reduction and disproportionation have been accomplished, in accordance with the foregoing procedure. In accordance with this aspect of the invention, the cupric ions are reduced by hydrogen in the presence of the solid catalyst but without the presence of a cuprous ion stabilizing ligand. As a result, the cupric ions form copper metal which precipitates on the catalyst. The catalyst, which is poisoned with the copper metal, is then separated from the now barren copper raffinate by filtration. The catalyst is then regenerated by exposing it to fresh, pregnant cupric solution in the presence of a stabilizing ligand, and under an intert atmosphere.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for recovering copper values from an acidic solution of solubilized cupric ions comprising:
   a. reducing the cupric ions with hydrogen in the presence of a solid hydrogenation catalyst and in the presence of a cuprous ion stabilizing ligand to produce a soluble cuprous ion complex;
   b. terminating said hydrogenation reaction before copper metal precipitates on the solid catalyst;
   c. separating the aqueous acidic solution which contains the soluble ligand stabilized cuprous complex produced during the hydrogenation of step (a) from the solid catalyst; and
   d. disproportionating the cuprous ions in said ligand stabilized cuprous complex to produce copper metal and cupric ions.

2. The process as set forth in claim 1 including the additional steps of repeating steps (a) through (d) to treat the cupric ions produced in step (d).

3. The process as set forth in claim 2 wherein the last amount of cupric ions are removed from the acidic solution of solubilized cupric ions, after several stages of hydrogenation and disproportionation by the following steps:
   a. reducing the cupric ions with hydrogen in the presence of a solid hydrogenation catalyst, and in the absence of the cuprous ion stabilizing ligand, to produce copper metal which precipitates onto the catalyst;
   b. separating the catalyst containing the precipitated copper from the solution; and
   c. regenerating the catalyst containing precipitated copper by exposing it to a pregnant solution containing cupric ions and a cuprous ion stabilizing ligand in sufficient quantities to dissolve the copper metal precipitated onto the catalyst by producing a soluble cuprous complex.

4. The process as set forth in claim 1 wherein said cuprous stabilizing ligand is a nitrile.

5. The process as set forth in claim 1 wherein said cuprous stabilizing ligand is acetonitrile.

6. The process as set forth in claim 1 wherein said hydrogenation catalyst is immobilized on a suitable support.

7. The process as set forth in claim 1 wherein said hydrogenation catalyst is chosen from the group consisting of palladium and platinum.

8. A process for recovering copper values from an acidic solution of solubilized cupric ions comprising:

a. providing an electrolytic cell comprising a case, an inert anode, an inert cathode, a semipermeable membrane interposed between said anode and cathode in said case, a cathodic compartment and an anodic compartment separated by said membrane, said anodic compartment containing an acid;

b. introducing the acidic solution of solubilized cupric ions and a cuprous ion stabilizing ligand into said cathodic compartment;

c. passing a current through said cell at a potential sufficient to reduce the cupric ion to cuprous ions but insufficient to precipitate copper metal on said cathode;

d. removing the cuprous ions produced in step (c) from the cathodic compartment in the form of soluble ligand stabilized cuprous ion complexes; and e. disproportionating the cuprous ions in said cuprous complex to produce copper metal and cupric ions.

9. The process as set forth in claim 8 wherein the anions of the cupric solution are sulfate ions.

10. The process as set forth in claim 8 wherein the cuprous stabilizing ligand is a nitrile.

11. The process as set forth in claim 10 wherein the nitrile is acetonitrile.

12. The process as set forth in claim 8 wherein the solution in said cathodic compartment is circulated through said compartment.

13. The process as set forth in claim 8 wherein said anodic compartment contains cupric sulfate and sulfuric acid.

14. A process for recovering copper values from an acidic solution of solubilized cupric ions comprising:

a. electroreducing said cupric ions in the presence of a cuprous ion stabilizing ligand to produce cuprous ion;

b. terminating said electroreduction reaction before copper metal precipitates to produce a solution containing soluble ligand stabilized cuprous ion complexes;

c. disproportionating the cuprous ions in said cuprous complex to produce copper metal and cupric ions.

15. The process as set forth in claim 14 where said cuprous stabilizing ligand is a nitrile.

16. The process as set forth in claim 14 where said cuprous stabilizing ligand is acetonitrile.

17. A process for recovering copper metal from an acidic solution containing cuprous ions comprising:

a. reacting the cupric ions in the solution with a nitrile and hydrogen in the presence of a solid hydrogenation catalyst under conditions to form a soluble stable cuprous nitrile complex;

b. separating the solution containing the soluble cuprous nitrile complex from the solid catalyst; and, c. removing nitrile portion of said complex to disporportionate the cuprous ions to produce copper metal and cupric ions.

18. The process as set forth in claim 17 wherein said nitrile is acetonitrile.

19. The process as set forth in claim 17 wherein the cupric ions produced in the first disproportionate reaction are further treated by reacting these cupric ions with the nitrile and hydrogen in the presence of a hydrogenation catalyst to form additional cuprous nitrile complex and disproportionating the further cuprous nitrile complex to produce additional copper and cupric ions.

20. The process as set forth in claim 17 wherein the nitrile removed in step (c) is reused in the reaction of step (a).

21. The process as set forth in claim 17 wherein said catalyst is immobilized on an inert support.

22. The process as set forth in claim 17 wherein said catalyst is chosen from the group consisting of palladium and platinum.

23. The process as set forth in claim 17 wherein the cupric ions produced in step (c) are contacted with hydrogen in the presence of a hydrogenation catalyst, copper metal is precipitated on said catalyst to produce a copper free raffinate which is removed.

24. The process as set forth in claim 23 wherein the copper precipitated on said catalyst is removed by treatment with a cupric solution containing acetonitrile.

25. A process for recovering copper metal from acidic cupric solutions, said process being characterized by the steps of:

a. providing an electrolytic cell comprising a case, an inert anode, an inert cathode, a semipermeable membrane interposed between said anode and cathode in said case, and a cathodic compartment and an anodic compartment separated by said membrane, said anodic compartment containing an acid;

b. introducing an acidic cupric ion solution and a nitrile into said cathodic compartment;

c. passing a current through said cell at a potential sufficient to reduce the cupric ion to cuprous ion but insufficient to precipitate copper metal on said cathode;

d. removing the cuprous ion produced in step (c) in the form of a stabilized cuprous nitrile complex; and, e. removing the nitrile ligand of said complex to disproportionate the cuprous ion and to produce copper metal and cupric ions.

26. The process as set forth in claim 25 wherein said nitrile is acetonitrile.

27. The process as set forth in claim 25 wherein the nitrile ligand removed in step (e) is reused in step (b).

28. The process as set forth in claim 25 wherein the anions in said cupric solutions are sulfate ions.

29. The process as set forth in claim 25 wherein the cupric ions produced in step (e) are reduced to copper metal.

30. The process as set forth in claim 25 wherein the cupric ions produced in step (e) are reduced to ligand stabilized cuprous ions and thereafter disproportionated.

31. The process as set forth in claim 25 wherein the cupric ions produced in step (c) are recycled to the cathodic compartment in step (b).

32. A process for producng copper metal from a solution of cuprous ions comprising the steps of:

a. precipitating the cuprous ions from the solution as an acetylide;

b. separating the cuprous acetylide from the solution;

c. reacting the acetylide with an acid and a nitrile to form a stable cuprous nitrile complex;

d. removing the nitrile from the complex to disproportionate the cuprous ions to produce copper metal and cupric ions;

e. separating the cupric ions from the copper metal;

f. reducing the cupric ions separated in step (e) in the presence of a nitrile to form a stable cuprous complex; and, g. disproportionating the cuprous ions produced in step (f) to copper metal and cupric ions.

33. The process as set forth in claim 32 wherein step (f) is effected by reacting said cupric ions with hydrogen and a nitrile ligand in the presence of a hydrogenation catalyst.

34. The process as set forth in claim 32 wherein the hydrogenation catalyst is immobilized on a suitable support.

35. The process as set forth in claim 32 wherein the hydrogenation catalyst comprises a metal chosen from the group consisting of palladium and platinum.

36. The process as set forth in claim 32 wherein step (f) is effected by:
 a. providing an electrolytic cell comprising a case, an inert anode, an inert cathode, a semipermeable membrane interposed between said anode and cathode in said case, and a cathodic compartment and an anodic compartment separated by said membrane, said anodic compartment containing an acid;
 b. introducing the acidic cupric ion solution and cuprous stabilizing ligands into said cathodic compartments;
 c. passing a current through said cell at a potential sufficient to reduce the cupric ions to cuprous ions but insufficient to precipitate copper metal on said cathode; and,
 d. removing the cuprous ion produced in step (c) in the form of ligand stabilized cuprous ions.

37. The process as set forth in claim 32 wherin the reduction of step (g) is effected by removing the nitrile ligand from said complex to disproportionate the cuprous ions and to produce copper metal.

38. The process as set forth in claim 32 wherein step (a) is effected by passing gaseous acetylene through the solution of cuprous ions.

39. The process as set forth in claim 32 wherein the nitrile ligand is acetonitrile.

40. The process as set forth in claim 2 wherein acetylene is produced in step (c) and is reused in step (a).

41. The process as set forth in claim 32 wherein the nitrile ligand removed in step (d) is reused in step (c).

42. The process as set forth in claim 32 wherein an ammoniacal solution of cuprous ions is produced by reducing an ammoniacal cupric ion solution with carbon monoxide.

43. The process as set forth in claim 32 wherein an ammoniacal solution of cuprous ions is produced by passing a mixture of carbon monoxide and hydrogen through an ammoniacal cupric ion solution and wherein the hydrogen in said mixture is recovered and used for the reduction of step (f).

44. The process as set forth in claim 32 wherein the acid used in step (c) is sulfuric acid.

45. A process for producing copper metal from an ammoniacal solution containing cuprous ions comprising the steps of:
 1. precipitating the cuprous ions from solution as an acetylide;
 2. separating the cuprous acetylide from solution;
 3. reacting the acetylide with an acid and a nitrile ligand to form a stable cuprous complex;
 4. removing the nitrile ligand from said complex to disproportionate the cuprous ions and to produce copper metal and acidified cupric ion solution;
 5. separating the cupric ions from the copper metal;
 6. reducing the cupric ions produced in step (4) to ligand stabilized cuprous ions by:
  a. providing an electrolytic cell comprising a case, an inert anode, an inert cathode, a semipermeable membrane interposed between said anode and cathode in said case, and a cathodic compartment and an anodic compartment separated by said membrane, said anodic compartment containing an acid;
  b. introducing the cupric ion solution produced in step (4) and a nitrile ligand into said cathodic compartment;
  c. passing a current through said cell at a potential sufficient to reduce the cupric ion to cuprous ion but insufficient to precipitate copper metal on said cathode to produce a stabilized cuprous complex; and,
 7. removing the ligand from said complex to disproportionate the cuprous ions and to produce cupric ions and copper metal.

46. The process as set forth in claim 45 wherein the cupric ions produced in step (7) are reduced to copper metal.

47. The process as set forth in claim 45 wherein the acid used in step (3) is sulfuric acid.

48. The process as set forth in claim 45 wherein step (1) is effected by contacting acetylene with said solution, acetylene is produced in step (3) and is reused in step (1).

49. The process as set forth in claim 45 wherein said nitrile is acetonitrile.

50. A process for producing copper metal from an ammoniacal solution containing cuprous ions comprising the steps of:
 a. precipitating the cuprous ions as a cuprous acetylide;
 b. separating the cuprous acetylide from solution;
 c. reacting the cuprous acetylide with a nitrile ligand in the presence of an acid to form a cuprous complex;
 d. removing the nitrile ligand from said complex to disproportionate the cuprous ions to produce an acidified cupric ion solution and copper metal;
 e. separating the cupric ion solution from the copper metal;
 f. reacting the cupric ion solution produced in step (e) with hydrogen and a nitrile ligand in the presence of an acid and a hydrogenation catalyst to form a cuprous complex; and,
 g. removing the ligand from said cuprous complex to disproportionate the cuprous ions to form copper metal and cupric ions.

51. The process as set forth in claim 50 wherein step (a) is effected by contacting acetylene with the cuprous ions.

52. The process as set forth in claim 50 wherein acetylene is produced in step (c) and is reused in step (a).

53. The process as set forth in claim 50 wherein the nitrile removed in step (d) is reused in step (c).

54. The process as set forth in claim 50 wherein the nitrile removed in step (d) is reused in step (f).

55. The process as set forth in claim 50 wherein the nitrile removed in step (g) is reused in step (c).

56. The process as set forth in claim 50 wherein the nitrile comprises acetonitrile.

57. The process as set forth in claim 50 wherein the cupric ions produced in step (g) are solubilized in acid media and are contacted with hydrogen in the presence of a hydrogenation catalyst, copper metal is precipitated on said catalyst, the copper free raffinate is separated from said catalyst, and the copper metal is removed from said catalyst.

58. The process as set forth in claim 57 wherein the copper free raffinate is acidic and is used in step (*c*) with a nitrile to react with the cuprous acetylide.

59. The process as set forth in claim 58 wherein copper metal is removed from the catalyst by reacting the copper with a solution of cupric ions and a nitrile to form a soluble cuprous nitrile complex.

60. The process as set forth in claim 50 wherein the cupric ions produced in step (*g*) are reduced to copper metal.

61. A process for producing copper metal from an ammoniacal solution containing cupric ions comprising the steps of:
 a. reducing the cupric ions with a hydrogen containing gas to produce cuprous ions and a hydrogen rich off gas;
 b. precipitating the cuprous ions as a cuprous acetylide by contacting them with acetylene;
 c. separating the cuprous acetylide from the solution;
 d. reacting the cuprous acetylide with a nitrile ligand in the presence of an acid to form a cuprous complex and acetylene;
 e. removing the nitrile ligand from said complex to disproportionate the cuprous ions to produce an acidified cupric ion solution and copper metal;
 f. separating the cupric ion solution from the copper metal;
 g. reacting the acidic cupric ion solution produced in step (*e*) with the hydrogen rich off gases from step (*a*) and a nitrile ligand in the presence of an immobilized hydrogenation catalyst to produce a cuprous complex; and,
 h. adding the cuprous complex produced in step (*g*) to the container of step (*d*).

62. The process as set forth in claim 61 wherein the nitrile ligand comprises acetonitrile.

63. The process as set forth in claim 61 wherein the acetylene produced in step (*d*) is reused in step (*b*).

64. The process as set forth in claim 61 wherein the nitrile removed in step (*e*) is reused in step (*d*).

65. The process as set forth in claim 61 wherein the nitrile removed in step (*e*) is reused in step (*g*).

* * * * *